United States Patent [19]

Lindacher

[11] Patent Number: 5,148,009
[45] Date of Patent: Sep. 15, 1992

[54] BAR CODE SCANNING APPARATUS

[75] Inventor: Joseph M. Lindacher, Cambridge, Ohio

[73] Assignee: NCR Corporation, Dayton, Ohio

[21] Appl. No.: 625,324

[22] Filed: Dec. 10, 1990

[51] Int. Cl.$^5$ .............................................. G06K 7/10
[52] U.S. Cl. .................................... 235/462; 235/470; 235/472
[58] Field of Search ............... 235/454, 462, 470, 472, 235/383; 350/6.5, 6.6; 359/212, 213; 361/311

[56] References Cited

U.S. PATENT DOCUMENTS

| | | | |
|---|---|---|---|
| 4,369,361 | 1/1983 | Swartz et al. | 235/462 |
| 4,644,143 | 2/1987 | McJohnson et al. | 235/462 |
| 4,652,732 | 3/1987 | Nickl | 235/462 |
| 4,656,344 | 4/1987 | Mergenthaler et al. | 235/462 |
| 4,766,297 | 8/1988 | McMillan | 235/470 |
| 4,766,298 | 8/1988 | Meyers | 235/462 |
| 4,914,280 | 4/1990 | Peterson | 235/454 |
| 4,988,851 | 1/1991 | Kohno et al. | 235/462 |

FOREIGN PATENT DOCUMENTS 60-168282 8/1985 Japan.

*Primary Examiner*—John W. Shepperd
*Assistant Examiner*—Tan Nguyen
*Attorney, Agent, or Firm*—Richard W. Lavin

[57] ABSTRACT

A portable bar code scanner includes a housing member having a supporting surface which includes an aperture extending in a horizontal direction through the housing member. The supporting surface includes a recessed portion which is in communication with the aperture and which supports a portable bar code scanner. A mirror member mounted within the aperture and at an angle to the supporting surface deflects the scanning light beams through the aperture for scanning coded indicia positioned adjacent the aperture. A second embodiment discloses a support member slidably positioned within the aperture from either end of the aperture in which is mounted a mirror member for deflecting the scanning light beams through the support member and the aperture.

16 Claims, 7 Drawing Sheets

BAR CODE SCANNING APPARATUS

CROSS REFERENCE TO RELATED APPLICATION

Bar Code Scanning Apparatus, co-pending Application Ser. No. 07/625,331, filed on Dec. 10, 1990, invented by Park Doing, Donald W. Carr and Charles K. Wike, Jr., assigned to the NCR Corp.

BACKGROUND OF THE INVENTION

The present invention relates to optical bar code scanning systems and more particularly to a portable bar code scanning device in which a bar code label is moved across a transparent surface on which is projected a scanning pattern for scanning the bar code label during a merchandise checkout operation.

In present-day merchandising point-of-sale operations, data pertaining to the purchase of a merchandise item is obtained by reading data encoded indicia such as a bar code label printed on or attached to the merchandise item. In order to standardize the bar codes used in various point-of-sales checkout systems, the grocery industry has adopted a uniform product code (UPC) which is in the form of a bar code. Reading systems which have been constructed to read this type of bar code include hand-held wands which are moved across the bar code, and stationary optical scanning systems normally located within the cabinet structure of a checkout counter, in which the bar code is read when a purchased merchandise item is moved across a window constituting the scanning area of the counter, which movement is part of the process of loading the item into a baggage cart. Hand-held wands or scanners emit a single scan line which is directed over the bar code by the operator while the stationary optical reader systems emit a multiline scan pattern through which the bar code label is moved, enabling a higher throughput of scanning bar code labels to occur over that of hand-held scanners. Where the merchandise consist of soft materials such as clothing or other types of soft material, hand-held scanners have been employed to read the bar code labels attached to the material in which the bar code label is manually positioned adjacent the hand held-scanner. It has been found that this type of scanning operation has been ineffective because the bar code label was not positioned within the dept of field of the scanner or that the projected scanning pattern was not located adjacent the bar code label. Because of this, there has arisen a need for a portable scanning device which can be moved to any one of a plurality of checkout stations within a business establishment allowing a hands free scanning operation to occur where there is limited counter-space available at a checkout station.

The background art known to the applicants at the time of the filing of this application includes U.S. Pat. No. 4,369,361 which discloses a portable stand-alone desk-top laser scanning workstation including a laser scanning head mounted above a support base facing the operator in which objects bearing bar code symbols to be scanned are passed under the head, and U.S. Pat. No. 4,766,297 which discloses a support member for supporting a portable hand-held scanning device in which the support member includes structure for sensing the presence of an object between the head portion and the base portion of the support member and for automatically initiating a reading of a bar code symbol by the portable hand-held scanning device each time the sensing structure senses the presence of an object.

SUMMARY OF THE INVENTION

A portable bar code scanning system is provided which comprises a housing member including a horizontal supporting surface and a side sloping surface both having a aperture in which is mounted a transparent substrate and which further includes a mirror member mounted at an angle to the floor of the housing member adjacent the horizontal and sloping surface. Secured to the housing member is a removable support member for supporting the handle of a hand-held bar code scanner on opposite ends of the housing member. Upon the positioning of the scanning head of a bar code scanner on the horizontal surface adjacent the transparent substrate and operating the scanner, light beams forming an optical scanning pattern are projected from the bar code scanner through the horizontal surface towards the mirror member which reflects the scanning pattern onto the transparent substrate mounted in the sloping surface. The operator will move the bar code label across the transparent substrate in the sloping surface adjacent the scanning pattern projected thereon to complete a scanning operation of the bar code label. The housing member can be rotated to position the sloping surface in a scanning position in accordance with the space available for a scanning operation. A second embodiment allows the scanning head of the bar code scanner to be positioned on a surface which is offset to a horizontal plane and includes a mirror housing assembly in which are mounted the angled mirror member and a sloping transparent substrate. The housing assembly is slidably inserted in either of the apertures in the side sloping surfaces enabling a scanning operation to occur on either side sloping surface.

It is therefore a principal object of this invention to provide a portable optical bar code scanning apparatus having a scanning aperture oriented to allow for hands free scanning of a bar code label where the scanning apparatus is orientated in a plurality of scanning positions.

It is another object of this invention to provide a bar code scanning apparatus which is light weight and accommodates a hand-held scanner as the source of scanning light beams.

It is another object of this invention to provide a portable bar code scanning apparatus which is simple in construction and therefore low in cost.

BRIEF DESCRIPTION OF THE DRAWINGS

These and other objects, features and advantages of the invention, as well as the invention itself, will become more apparent to those skilled in the art and in light of the following detailed description taken in consideration with the accompanied drawings wherein like reference numerals indicate like or corresponding parts throughout the several views and wherein.

DESCRIPTION OF THE PREFERRED EMBODIMENT

Figure 1:
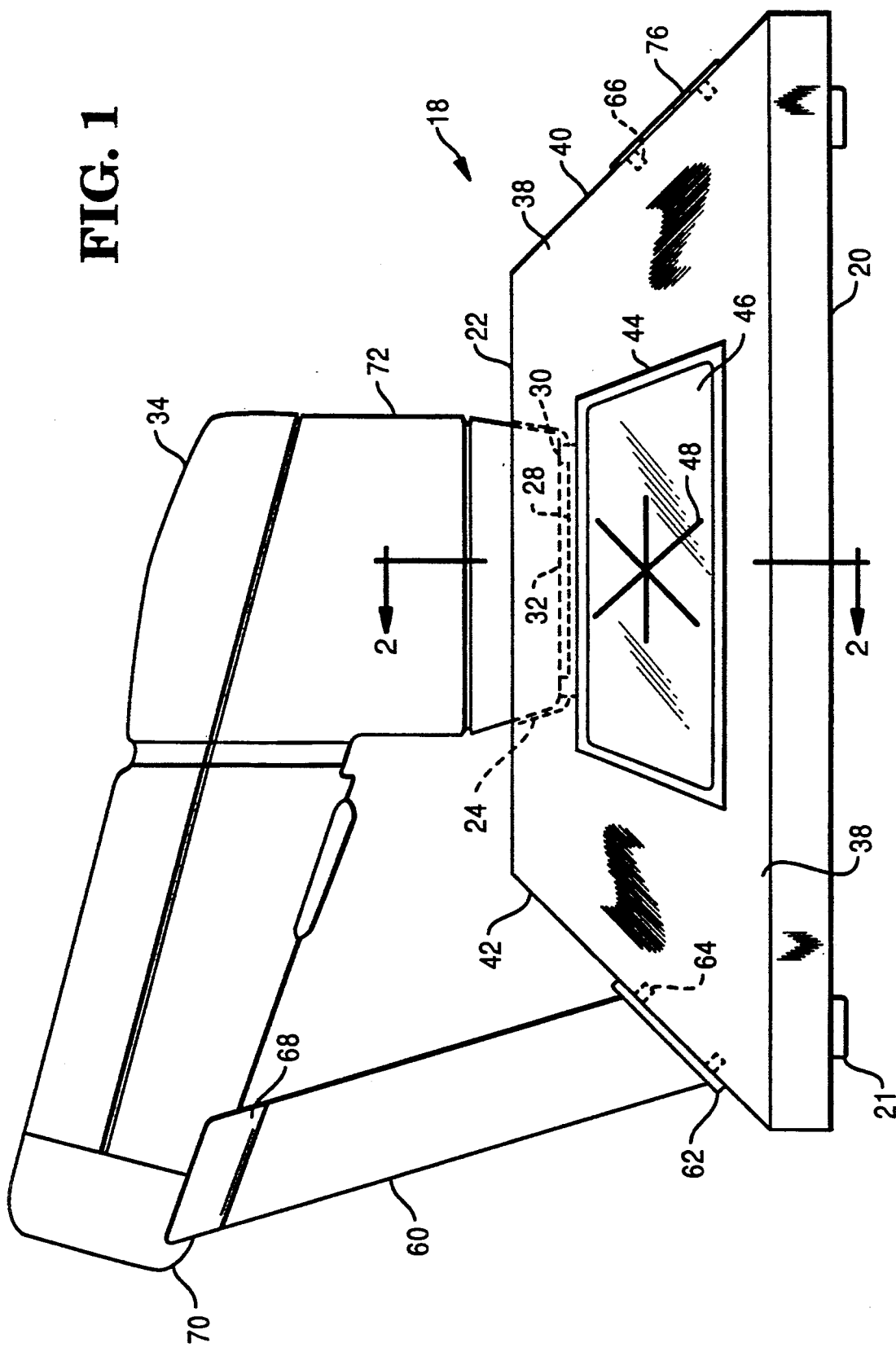
FIG. 1 is a side view of one embodiment of the portable optical bar code scanning apparatus of the present invention showing the location of the hand-held scanner when positioned on the housing member together with the removable handle support member and the multiline scanning pattern generated by the scanner.

Referring now to FIG. 1, there is shown a side view of the bar code scanning device of the present invention generally indicated by the numeral 18 comprising a housing member 20 having a top horizontal surface 22 including an aperture 24 communicating with the interior portion 26 (FIG. 2) of the housing member 20. Secured to the bottom surface of the housing member 20 are supporting pad members 21. As best seen from FIG. 2, mounted within the aperture 24 is an entrance transparent substrate 28 on which is positioned a plastic guard member 30 which is engaged by the front face portion 32 (FIG. 1) of a hand-held optical bar code scanner 34 inserted into the aperture 24 as part of a scanning operation as will be described more fully hereinafter.

Figure 2:
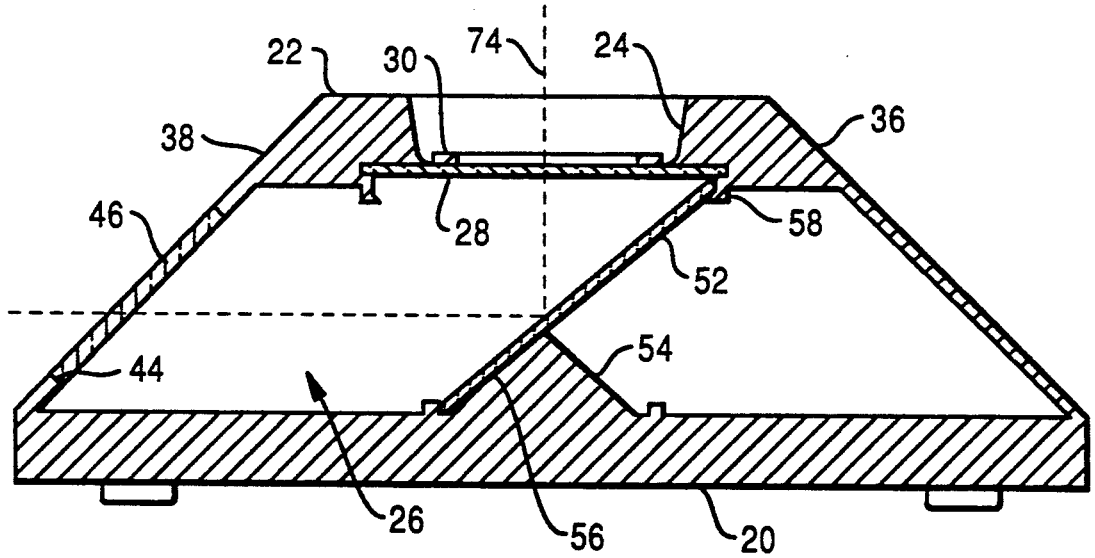
FIG. 2 is a sectional view taken on line 2—2 of FIG. 1 showing the location and orientation of the reflecting mirror member.
Figure 4:
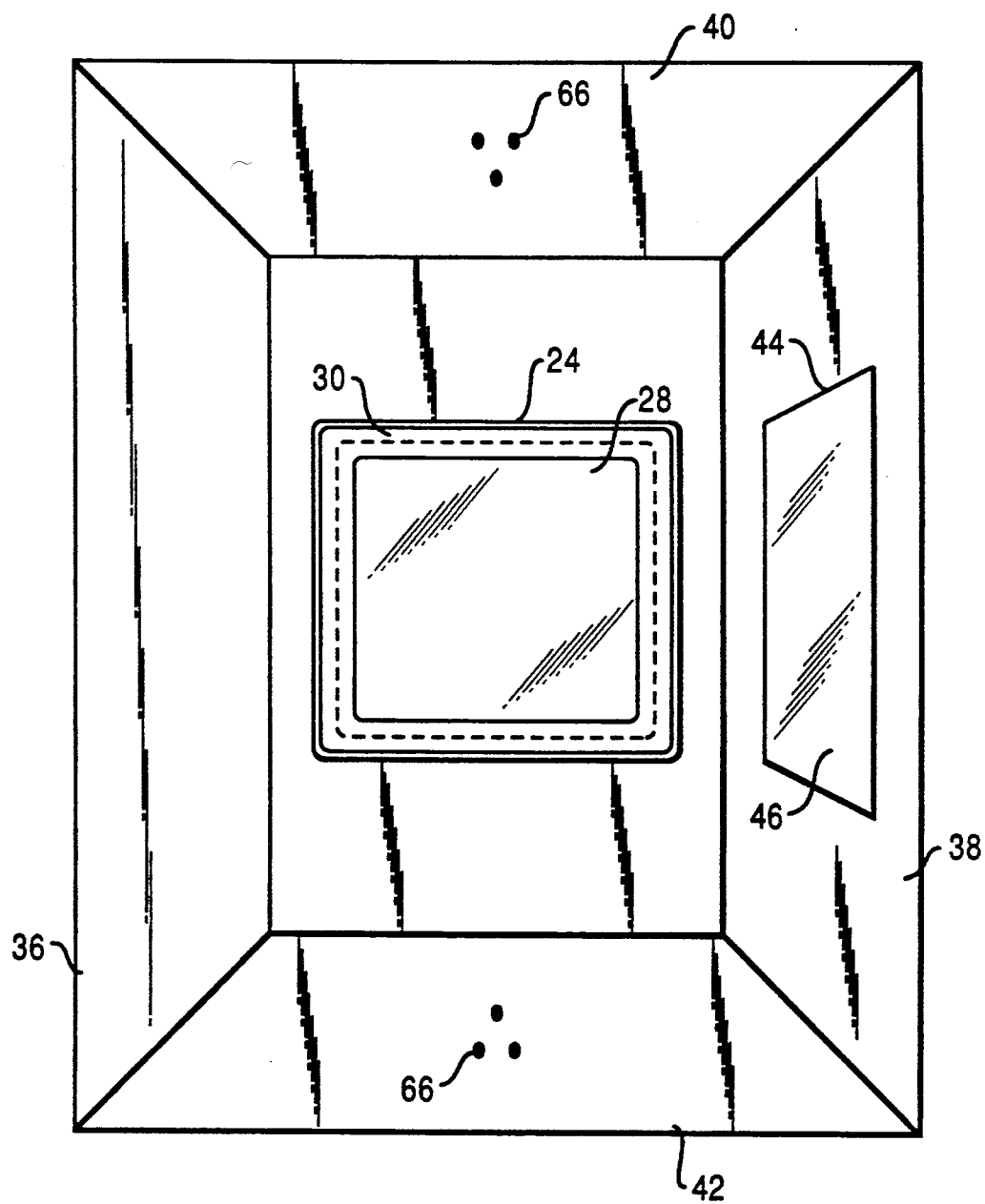
FIG. 4 is a top elevational view of the housing member of the bar code scanning apparatus of FIG. 1.

The housing member 20 includes a pair of side sloping surfaces 36, 38 and a front 40 and rear 42 sloping surface. As best shown in FIGS. 1, 2 and 4, located in the side surface 38 is an aperture 44 within which is mounted an exit transparent substrate 46. The substrate 46 is preferably constructed of a transparent material such as water white glass which will display the multiline scan pattern 48 projected by the bar code scanner 34 in a manner that will now be described.

Mounted within the interior portion 26 of the housing member 20 is a reflecting mirror member 52 (FIG. 2) having one end positioned on an abutment portion 54 of the housing member 20 which has its abutting surface 56 inclined at an angle of approximately 45 degrees. The other end of the mirror member 52 engages a depending portion 58 of the housing member 20 which is located adjacent the aperture 24.

Figure 3:
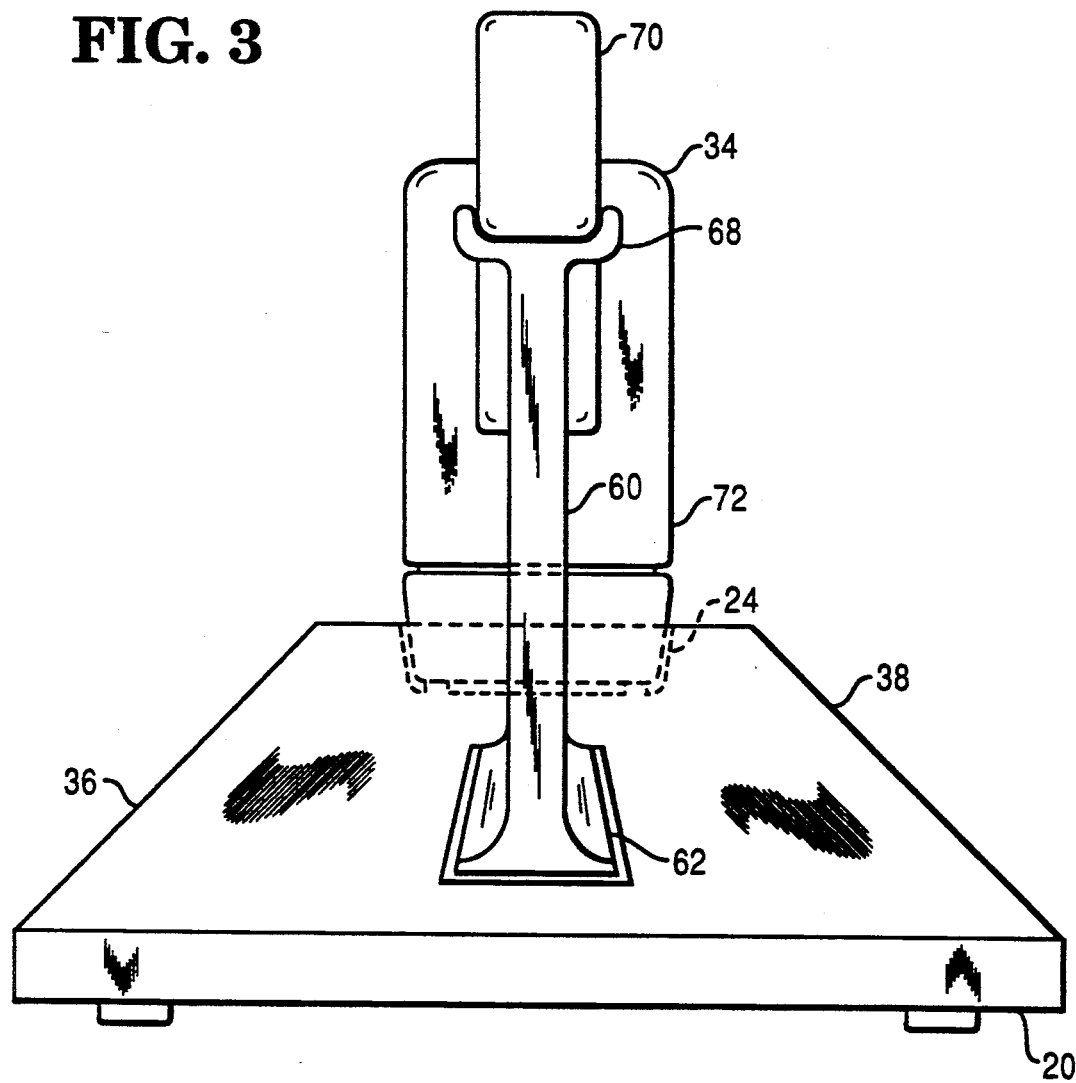
FIG. 3 is a rear elevational view of the bar code scanning apparatus of FIG. 1 showing the mounting of the handle of the bar code scanner on the movable support member.

Associated with the housing member 20 is a removable elongated support member 60 (FIGS. 1 and 3) having a lower mounting portion 62 in which are located three stud members 64 which are inserted into correspondingly located holes 66 (FIG. 4) in each of the front 40 and rear 42 sloping surfaces. As best seen from FIG. 3, the support member 60 has an upper U-shaped supporting portion 68 within which is positioned the handle portion 70 of the bar code scanner 34 for positioning the scanning head portion 72 of the scanner 34 within the aperture 24 and on the plastic guard member 30.

In the operation of the bar code scanning device 18, the operator will position the handle portion 70 of the hand-held scanner 34 within the supporting portion 68 of the support member 60. The operator will then lay the front face portion 32 of the scanner 34 onto the plastic guard member 30 within the aperture 24 and turn on the scanner which projects the scanning light beams forming the scan pattern 48 along the beam axis 74 (FIG. 2) which is projected through the entrance substrate 28 onto the reflecting mirror member 52 from where the light beams are focused on the exit transparent substrate 46. In scanning a bar code label, the label is positioned on the surface of the substrate 46 and moved across the scanning pattern 48 for reading the bar code label in a manner that is well known in the art.

In the present embodiment, the depth of field of the projected scanning light beams extends from about an inch in front of the hand-held scanner 34 to a point adjacent the outer face of the exit transparent substrate 46. As previously described, the angle of the mirror member 52 is approximately 45 degrees to the exit substrate 46. It is obvious that the substrate 46 and the mirror 52 may be oriented at different angles to accomplish the projection of the scanning pattern on the surface of the substrate 46. One of the controlling factors in designing the angle geometry of the substrates 28, 46 and the mirror 52 is the depth of field of the scanning pattern projected by the hand-held scanner 34. It is desirable that the scanning pattern 48 be in focus when projected on the exit transparent substrate 46. When the configuration of the checkout station, in which the bar code scanner is mounted, requires it, the orientation of the bar code scanner 34 can be reversed from the position shown in FIG. 1. This is accomplished by removing the support member 60 from the rear surface 42 and mounting the support member on the front surface 40 utilizing the holes 66 (FIG. 4) in the surface. The holes 66 in the surface 42 can accommodate a cover member 76 (FIG. 1) when not in use to support the support member 60.

Figure 5:
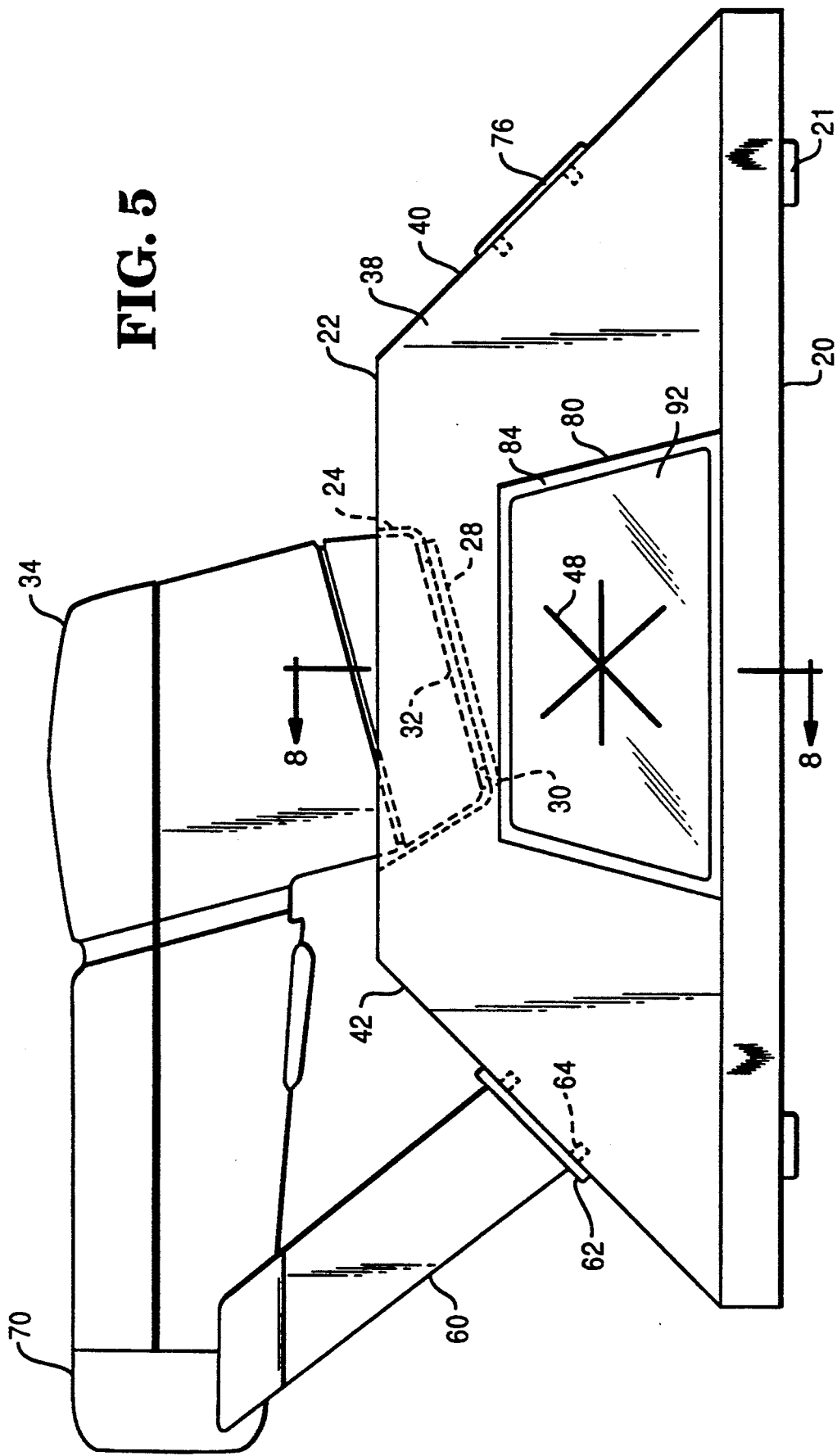
FIG. 5 is a side elevational view of a second embodiment of the present invention showing the bar code scanning apparatus mounted offset to the top horizontal surface of the housing member.
Figure 6:
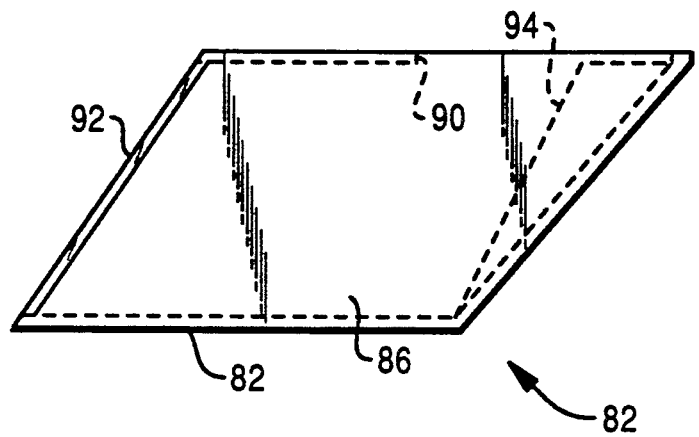
FIG. 6 is a side elevational view of the mirror housing assembly.
Figure 7:
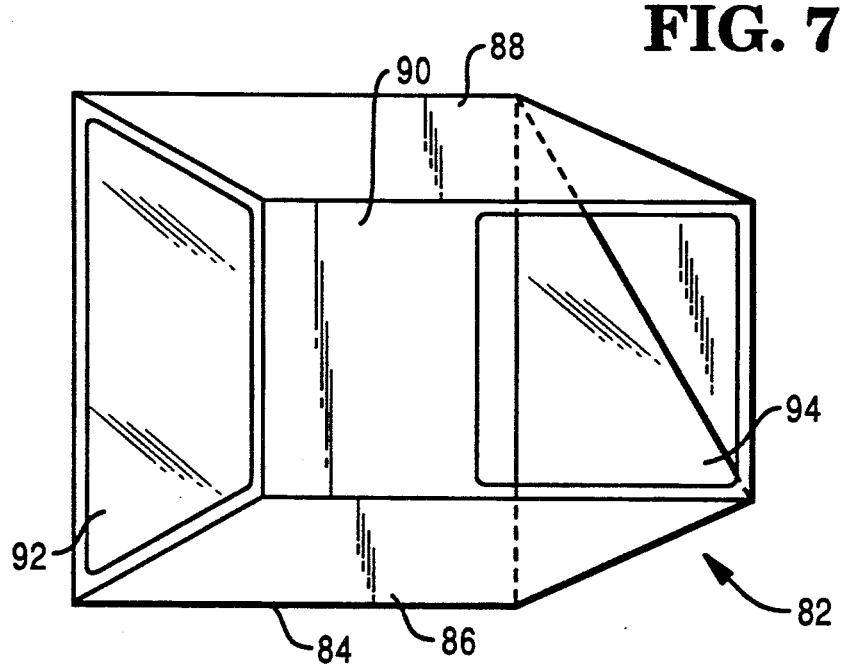
FIG. 7 is top elevational view of the mirror housing assembly showing the skew angle of the reflecting mirror member when mounted in the mirror housing assembly.
Figure 8:
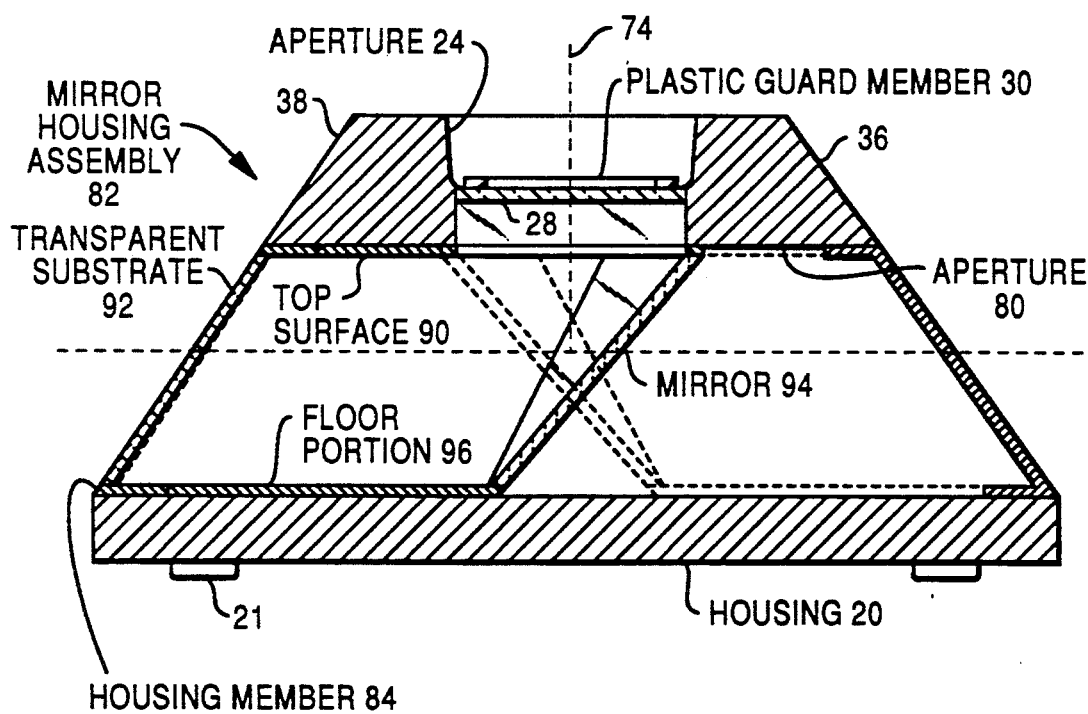
FIG. 8 is a sectional view taken on line 8—8 of FIG. 5 showing details of the mounting of the mirror housing assembly within the housing member.

Referring now to FIG. 5, there is shown a second embodiment of the present invention in which the aperture 24 is offset to the horizontal surface 22 of the housing member 20 to allow the handle portion 70 of the bar code scanner 34 to be positioned for easier grasping by the operator and to make the scanning apparatus more compact. The housing member 20 further includes an aperture 80 which extends horizontally through the housing member 20 (FIG. 8) in which is slidably mounted a mirror housing assembly generally indicated by the numeral 82 (FIGS. 5–8 inclusive) comprising a housing member 84 which is slidably inserted from either side of the housing member 20 in the aperture 80 located in either of the sloping side walls 36, 38 (FIG. 8). The housing member 84 includes a pair of opposing side wall portions 86, 88 (FIG. 7), a partially extending top surface portion 90 and a transparent substrate 92 mounted at one end of the housing member 84 and having a slope corresponding to the slope of the side wall portions 86,88 (FIG. 8).

Mounted intermediate the ends of the housing member 84 is a reflecting mirror member 94 which is orientated at a first angle of approximately forty-five degrees (FIGS. 6 and 8) to the floor portion 96 of the housing member 84 and skewed at a second angle (FIG. 7) between the side wall portions 86, 88 enabling the scanning light beams which are projected along the beam axis 74 (FIG. 8) by the scanner 34 to be reflected by the mirror member 94 through the transparent substrate 92 for scanning a bar code label positioned adjacent the substrate 92. It will be seen from this construction that the mirror member 94 may be inserted from either side of the housing member 20 facilitating a scanning operation on either side of the housing member 20.

It will be seen from the embodiments of the invention disclosed that a checkout operator can easily adjust the position of the housing member to conveniently move the bar code label past the scanning substrate utilizing both hands to grasp the article on which the bar code label is attached.

Although the preferred embodiment of the present invention has been described herein, it is not intended that the invention be restricted thereto, but that it be limited only by the true spirit and scope of the appended claims.

What is claimed is:

1. A scanning system for scanning coded indicia comprising:
   a housing member having a top supporting surface and oppositely located side surface portions;
   said housing member further including a first aperture extending horizontally through said housing member and through said oppositely located side surface portions;
   deflecting means mounted intermediate the ends of said first aperture for movement between first and second deflecting positions within said first aperture at an angle to said top supporting surface;
   said top supporting surface including a second aperture extending in a vertical direction to be in communication with said deflecting means; and
   a source of scanning light beams positioned within said second aperture for projecting scanning light beams at said deflecting means whereby the scanning light beams are deflected by said deflecting means in a first direction through said first aperture when in said first deflecting position and in a second direction through said first aperture which is apposite to said first direction when in said second deflecting position for scanning coded indicia positioned adjacent the ends of said first aperture.

2. The scanning system of claim 1 in which the first aperture extends in a direction parallel to the surface of said top supporting surface.

3. The scanning system of claim 2 in which said deflecting means comprises a mirror member mounted at an angle of approximately forty-five degrees to said top supporting surface.

4. The scanning system of claim 1 which further includes a transparent substrate mounted at one end of the first aperture for receiving the scanning light beams from the deflecting means enabling the scanning light beams to scan coded indicia positioned adjacent the substrate.

5. The scanning system of claim 1 in which the source of scanning light beams is mounted within said second aperture perpendicular to said top supporting surface.

6. A scanning system for scanning coded indicia comprising:
   a housing member having a top horizontal supporting surface and a pair of oppositely located inclined side surface portions;
   said housing member including a first aperture extending in a horizontal direction through said housing member and through said oppositely located inclined side surface portions;
   said supporting surface further including a second aperture extending in a direction perpendicular to said first aperture and in communication therewith;
   deflecting means mounted intermediate the ends of said first aperture for movement through ninety degrees between first and second deflection positions within said first and second apertures at an angle to said top horizontal supporting surface; and
   a portable optical scanner removably positioned within said second aperture for projecting scanning light beams downwardly through said second aperture at said deflecting means enabling said deflecting means to deflect the scanning light beams in a first direction through said first aperture when in said first deflecting position and in a second direction which is opposite to said first direction when in said second deflecting position whereby the scanning light beams will scan coded indicia positioned adjacent the ends of said first aperture.

7. The scanning system of claim 6 which further includes a first transparent substrate mounted in one of said inclined side surface portions and at one of the ends of the first aperture for receiving the scanning light beams from the deflecting means when the deflecting means is in said first or second deflecting position enabling the scanning light beams to scan coded indicia positioned on the substrate.

8. The scanning system of claim 7 which further includes a second transparent substrate mounted in said second aperture for transmitting the scanning light beams projected from the optical scanner.

9. The scanning apparatus of claim 8 in which the first transparent substrate comprises a water white glass window and the second transparent substrate comprises a glass window.

10. The scanning system of claim 6 in which said deflecting means comprises a mirror member mounted at an angle of approximately forty-five degrees to said top horizontal supporting surface.

11. The scanning system of claim 6 in which said deflecting means comprises a support member slidably mounted intermediate the ends of said first aperture for movement to a position within said first aperture and adjacent said second aperture and said optical scanner means mounted on said support member and at an angle to said top horizontal supporting surface for deflecting the scanning light beams received from the optical scanner means through said support member and said first aperture.

12. The scanning system of claim 11 which further includes a transparent substrate mounted on said support member adjacent said optical means through which the scanning light beams are projected for scanning coded indicia positioned on the substrate.

13. The scanning system of claim 11 in which the optical means comprises a mirror mounted at an angle to said top horizontal supporting surface.

14. The scanning system of claim 11 in which the optical scanner is mounted within said second aperture to project the scanning light beams in a direction which is an angle to said top horizontal supporting surface.

15. The scanning system of claim 6 in which the optical scanner is mounted within said second aperture to project the scanning light beams in a direction perpendicular to said top horizontal supporting surface.

16. The scanning apparatus of claim 6 which further includes a supporting structure removably secured to the top horizontal supporting surface for supporting the optical scanner within said second aperture.

* * * * *

UNITED STATES PATENT AND TRADEMARK OFFICE
CERTIFICATE OF CORRECTION

PATENT NO. : 5,148,009

DATED : September 15, 1992

INVENTOR(S) : Joseph M. Lindacher

It is certified that error appears in the above-identified patent and that said Letters Patent is hereby corrected as shown below:

Column 5, line 39, "apposite" should be --opposite--.

Signed and Sealed this

Ninth Day of November, 1993

*Attest:*

BRUCE LEHMAN

*Attesting Officer*     *Commissioner of Patents and Trademarks*